Oct. 27, 1942.  C. D. PETERSON ET AL  2,300,036
CHANGE SPEED TRANSMISSION GEARING
Filed May 3, 1940  2 Sheets-Sheet 1
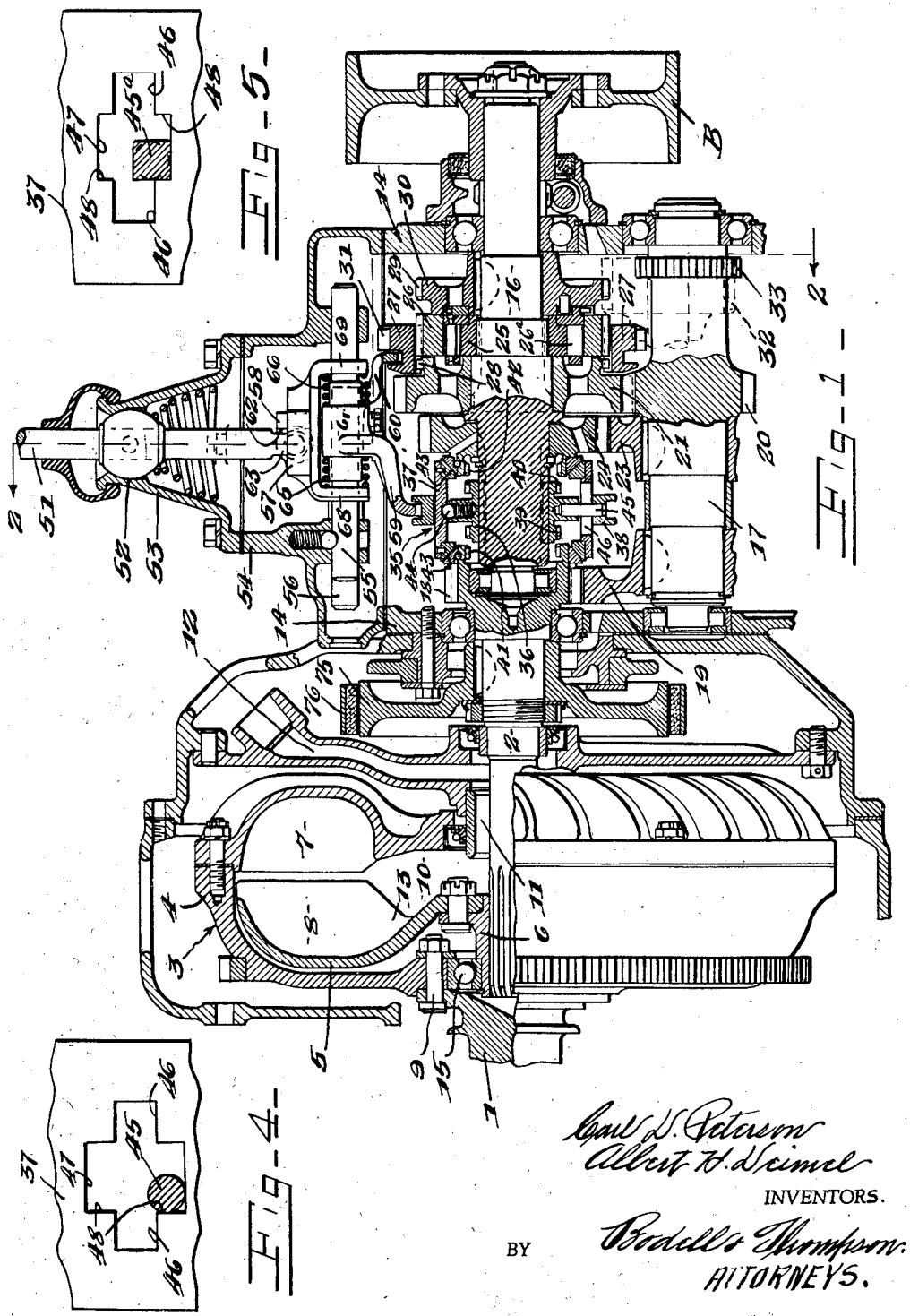
INVENTORS.
Carl D. Peterson
Albert H. Deimel
BY Bodell & Thompson
ATTORNEYS.

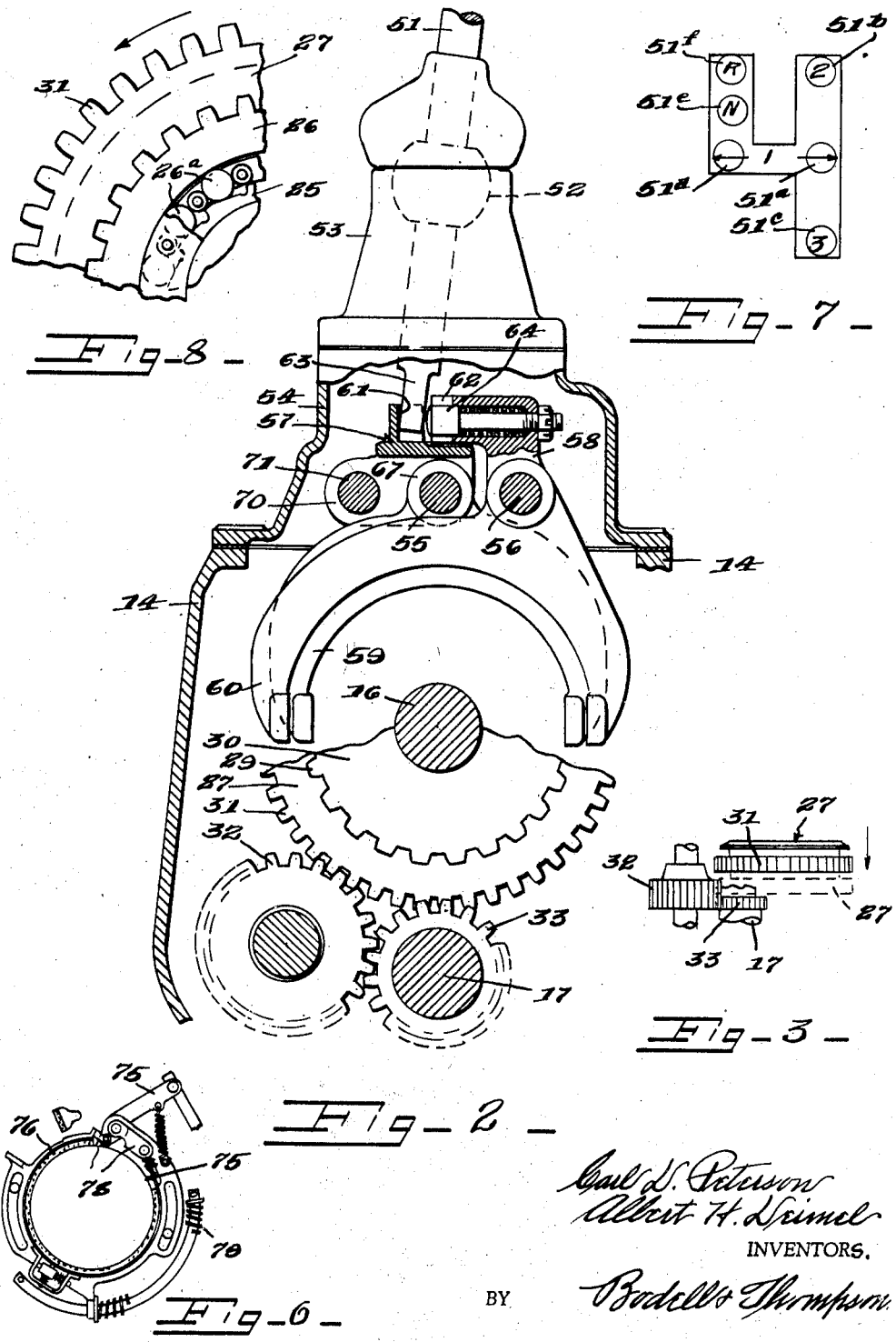

Patented Oct. 27, 1942

2,300,036

UNITED STATES PATENT OFFICE 2,300,036

CHANGE SPEED TRANSMISSION GEARING

Carl D. Peterson and Albert H. Deimel, Toledo, Ohio

Application May 3, 1940, Serial No. 333,200

3 Claims. (Cl. 74—333)

This invention relates to transmission mechanism for motor vehicles and the like and has for its object a transmission mechanism including a change-speed transmission gearing by which the gearing is initially in low or first forward speed and starts forward from stand still upon acceleration of the engine into a higher speed, and the shifts made into higher forward speeds with the first speed train of the transmission gearing in gear, and a coupling gear between the engine and the input shaft of the gearing, which has a slipping action at low slow engine speeds, as idling speed.

It further has for its object a transmission mechanism embodying a reverse train of gears and an over-running clutch to transmit the motion of the input shaft of the gearing to the output shaft when the gearing is in first or low speed gear through a clutch initially coupling the first gear train to the output shaft through the over-running clutch, and permits over-running of the output shaft when in higher gears and also serves as a gear in the reverse train when unclutched from the low forward train, and has a neutral or idle position between its position occupied when coupling the low gear train in gear and when in the reverse train.

It further has for its object a transmission mechanism with the characteristics above outlined in which the shifting mechanism includes two shifters or rails movable in parallel paths, one rail effecting the shifting of a clutch, which effects the higher forward speeds, and the other rail effecting the shifting of a clutch or clutch gear which serves to clutch the first speed gear train in gear through the over-running clutch and which is shiftable to an idle, central or neutral position, and also to third position in the reverse gear train, and a selecting and shifting lever having a fore-and-aft shifting movement and a lateral selecting movement and normally in selecting engagement with the first rail, where accelerating of the engine starts the vehicle through the low speed gear train.

It also has for its object a transmission mechanism, as above outlined, including a hydraulic coupling or a coupling which slips and does not transmit power at engine idling speed and in which the transmission gearing embodies a clutch in the higher speed ratios having a positive blocking, locking or balking action, until the speeds of the input and output shafts or the two parts to be clutched together, cross.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view, partly broken away, of a transmission mechanism embodying this invention.

Figure 2 is a sectional view, parts being omitted, taken on approximately line 2—2, Figure 1.

Figure 3 is a diagrammatic view of the reverse gearing.

Figure 4 is a fragmentary view of the balking member of the clutch which effects second and third speeds.

Figure 5 is a view, similar to Figure 4, of a modification thereof.

Figure 6 is a diagrammatic view of the brake for effecting the crossing of the speeds.

Figure 7 is a diagrammatic view of the path taken by the selecting and shifting lever of the transmission gearing.

Figure 8 is a fragmentary elevation of the over-running clutch.

1 designates the drive or engine shaft; 2 the driven shaft which is also the input shaft of the transmission gearing. 3 designates generally a coupling which permits relative rotation or slip of the opposing elements thereof at a predetermined low R. P. M., as idling speed of the engine, the coupling here shown being a hydraulic or fluid coupling of the general Föttinger type. It includes an impeller 4 in the form of a housing, and a runner 5, a hub 6 splined on the shaft 2. The impeller 4 and runner 5 have opposing radial vanes 7 and 8, and the impeller 4 is suitably secured, as by bolts 9, to a drive shaft, as the engine 1 to rotate therewith. The coupling is formed with a chamber 10 around the center thereof and around the shaft 2 which communicates through an annular passage 11, and a radial passage 12 with an outside tank, not shown, for the hydraulic fluid. The vanes or blades of the runner extend farther inward at 13 than the blades or vanes 7, so that at a predetermined low R. P. M., as at idling speed, the hydraulic fluid, instead of passing through the usual vortex between the vanes 7 and 8, passes into the chamber 10, and a relatively small portion passes through the passages 11 and 12 to the tank, and when the engine is accelerated, the liquid is drawn back into the coupling, due to the increase in centrifugal force. This vane arrangement effects a balance or a state of suspension between the centrifugal force and the void in the chamber 10 upon the expulsion of a small quantity of the fluid in the coupling, which normally runs full, through the chamber 10, passages 11, 12 and also a quick return of the fluid upon acceleration above the predetermined low or idling speed.

The feature just referred to of the coupling per se forms no part of this invention but constitutes the subject matter of another application, as the application of Carl D. Peterson and Albert H. Deimel, Serial Number 331,168, filed April 23, 1940.

In this embodiment of the invention, the output shaft 2 constitutes the input shaft of the transmission gearing. That is, the shaft 2 is a stem gear and is journalled in the front wall of the gear box 14 and also in a pilot bearing at 15 at the end of the engine shaft 2, here shown as in the hub of the impeller 4 which is connected at 9 to the engine shaft 1.

16 designates the output shaft of the gearing and 17 the countershaft. 18 designates a gear on the input shaft 2 which meshes with a gear 19 keyed to, or rotatable with, the countershaft 17. 20 designates a countershaft gear meshing with a gear 21 on the transmission shaft and loosely mounted thereon or capable of rotating about the same and being clutchable thereto. The gears 18, 19, 20 and 21 constitute a train of gears for effecting first or low speed forward. 23 is another countershaft gear meshing with a gear 24 on the output shaft 16 and normally rotatable about the same and clutchable thereto, the gear 24 being spaced from the gear 19, and a double clutch, to be presently described, is located between them. The gears 24 and 21 are located adjacent each other near the output shaft. The gear 21 drives the output shaft 16 through an over-running clutch which permits rotation of the output shaft faster than the gear 21, when the transmission is in a higher gear ratio than that effected through the train of gears 18, 19, 20 and 21 which is first speed forward, so that with the engine idling and the hydraulic coupling 3 not creating enough torque to move the vehicle in first speed forward, the vehicle will be stopped in first gear and ready to start merely upon accelerating the engine and letting off the vehicle brake, if it is on. B designates the drum of a transmission brake.

The over-running clutch is here shown as of the roller type including an inner driven ring or section 25 rotatable with or splined to the output shaft 16, an outer or driver ring or section 26 with rollers 26ª between them. The construction of the over-running clutch per se forms no part of this invention, and as the construction of over-running clutches is well known, further description thereof is thought to be unnecessary.

The final drive gear 21 of the first gear train is loosely rotatably mounted on the output shaft 16 but is normally clutched thereto at all times, except when the transmission is shifted to neutral and reverse as will be hereinafter described.

27 designates a clutch collar surrounding the outer or driving ring or section 26 of the over-running clutch and slidably splined thereon, the internal splines of the clutch collar being slidable at their ends into and out of interlocking engagement with complemental clutch teeth 28 on the gear 21, and being engaged therewith at all times, except when the gearing is shifted into neutral or reverse. This clutch collar is shiftable to the right (Figure 1) out of interlocking engagement with the teeth 28 of the gear 21 into neutral or central position, or exclusive engagement with the outer driver ring of the over-running clutch. When in this position, the gearing is in neutral. The clutch collar is also shiftable farther to the right to bring its splines into interlocking engagement with the splines 29 of a clutch section or collar 30 keyed to the output shaft 16 while also interlocked with the driver ring of the over-running clutch. The collar 27 is provided with spur gear teeth 31 and hence the collar is a clutch gear. This clutch gear constitutes part of the reverse gear train. As here shown, it meshes with a reverse or intermediary pinion 32 when the clutch gear 27 is shifted into clutching engagement with the clutch section 30 to produce reverse. The reverse pinion 32 meshes with a countershaft gear 33. The reverse train of gears therefore includes the countershaft gear 33, reverse pinion 32 and the clutch gear 27.

35 designates a double clutch shiftable in opposite directions from neutral position to effect second and third speeds forward in one direction, as to the right to effect second speed through the gear 18, countershaft 17, gears 19 and 23 and gear 24 on the output shaft; and to the left of central position to clutch the input and output shafts 2 and 16 together in direct drive relation.

The clutch 35 is a balking or locking clutch and that here shown includes an inner toothed section 36, an outer sleeve section 37, a shifting collar 38 around the sleeve section but coupled to the inner section 36 together with suitable means between the sections to cause them to move as a unit until the sleeve or friction section is stopped in its axial movement. The toothed section 36 has clutch teeth 39, 40 in opposite sides thereof for coacting respectively with complemental teeth 41, 42 on the gear 18 and the gear 24 respectively. The sleeve or friction section 35 has friction faces at its opposite ends for coacting with friction faces on the gears 18 and 24 respectively. The friction faces are of such angle and so located as to radial distance from the axis of the coupling as to have sufficient friction to engage the sleeve without effecting a synchronizing or braking effect to an appreciable extent. Any braking effect is merely incidental, and the friction faces are so arranged as to effect a locking and unlocking action or rocking of the sleeve 35. These friction faces designated 43 are shown at an angle of approximately 45°. The coupling between the toothed section 36 and the sleeve section 35 may be of any suitable construction, that here shown being radial spring-pressed poppets 44 carried by the inner toothed section, and spring-pressed into notches or grooves in the inner face of the sleeve 35, the side walls of the notches or grooves being bevelled at suitable cam angles for the situation in which the clutch is to be used. The inner toothed section 36 is coupled to the shifting collar 38 through radially extending posts 45, or 45ª, which extend through lengthwise slots 46 in the sleeve and into the collar 38. The slots 46 are shown in Figures 4 and 5 as provided with wider central portions or notches 47, but the end portions of the slots are substantially the same width as the posts 45, or 45ª, and the posts fit the end portions of the slots with a sliding fit. The end walls 48 of the notches are square or abrupt, or not inclined, and hence the posts have no camming action on the walls 48 tending to turn or rock the sleeve 35 relative to the inner toothed section 37. This arrangement positively blocks shifting in of the inner toothed section 26 until the speeds of the input and the output shafts cross. In Figure 5, the outer ends of the posts, which work in the slots 46 are shown as square at 45ª instead of circular.

The means for selecting and shifting the clutches 35 and 27 will now be described:

51 designates a selecting and gear shifting lever, here shown as mounted at 52 in a tower 53 to have a lateral selecting and a fore-and-aft shifting movement suitably mounted in the cover 54 of the gear box 14, the lever having a finger extending below its axis for coacting with shifters having forks coacting with the clutch 35 and 27. The shifters are usually axially movable rails 55 and 56 having blocks 57 and 58 carrying forks 59 and 60 coacting respectively with the shifting collar 38 of the double clutch 35 and with the clutch gear 27, the shifting motion of the block 57 being transferred through yielding means, as springs, to the rod 56.

The blocks 57 and 58 have notches 61, 62 into which the selecting finger 63 of the shifting lever enters, and these notches are in alinement when the gearing is in first gear position. The selecting movement of the finger 63 of the lever 51 to select the rail 56 is against the action of a suitable resistance, as a spring-pressed plunger 64 carried by the block 58, the plunger causing the finger to select the block 57, or initially hold the rail in first gear position. The shifting motion of the block 57 is transferred to the shift rail 55, which operates the balking or locking clutch 35 through springs 65, 66 coiled about the rod 55 and interposed between the hub 67 of the fork 59 and yoke arms 68, 69 provided on the block 57 and through which the rail 55 extends. The block 57 is held from tilting about the rod 55 by lugs or bearings 70 slidable along a stationary rod 71 suitably carried in the cover of the gear box; and the block 58 is held from tilting about the rail 56 by having an overhanging portion which overlaps and slides along the top of the block 57.

The upper end of the gear shifting lever 51 is capable of a movement generally similar to a figure four, as seen in Figure 7. Therefore, the finger at the lower end of the shifting lever moves oppositely to that of the upper end. This lever 51 normally stands initially at 51ª at the center of the leg of the figure four formation and is shiftable to one end, as the upper end of the leg into second gear into position 51ᵇ and then the full length of the leg rearward to third gear position 51ᶜ, and is shiftable along the cross-over or horizontal portion of the figure four formation from first gear position 51ª into position 51ᵈ where it is in alinement with the short arm of the figure four formation, and then about half way forwardly along the short arm into neutral position 51ᵉ and then to the upper end of the short arm into reverse position 51ᶠ.

In operation, with the vehicle at a standstill and in first gear, and the shift lever in central position 51ª, the vehicle is started by merely accelerating the engine. When sufficient speed of the vehicle is reached, the operator pushes forward on the shift lever 51, the lever first moving only part way, compressing the right hand spring 66 (Figure 1). The lever is held in this position by the driver. The accelerator is then released, so that the engine slows down, and as soon as the speed is reached equal to second speed at that road speed, the shift into second will unlock, that is, the posts 45, or 45ª, will aline with the end portions of the slots 46, and the engagement of the clutch 35 with the gear 24 is completed through the reaction of the spring 66. The operator knows from the feel of the lever 51 when full engagement takes place. The operator then speeds up the vehicle by accelerating the engine and pulls rearward on the lever, moving it from second to third speed, or from position 51ᵇ to position 51ᶜ, through position 51ª, and then releases the throttle. The movement of the lever compresses the spring 66 at the left in Figure 1. As the engine slows down under the releasing of the throttle to third speed at that vehicle speed and the speeds of the input and output shafts cross, the posts 45 or 45ª move into alinement with the end portion of the slot 46, permitting the shifting-in of the toothed or jaw member of the clutch 35 to be completed. To stop the vehicle, the driver merely moves the lever forward into central position or the position 51ª. The vehicle is then set to start in first gear by merely accelerating the engine. To shift from third down to second, or from position 51ᶜ to position 51ᵇ, the lever 51 is pushed forward, the throttle released a moment, and then again opened while the pressure is being held forward on the shift lever 51. As soon as the engine accelerates up to the vehicle speed in second gear, the clutch 31 will unlock as before described. That is, the posts 45 will line up with the end portions of the slots 46 when the speeds cross by the engine catching up with the vehicle in second gear. The shift lever will then move forward into second speed position under the reaction of the right hand spring 66 (Figure 1). The shift from second down to first, or from position 51ᵇ to position 51ª is effected in the same way as the shift from third to first. That is, by pulling the lever to central position 51ª and releasing the throttle to slow down the engine. Owing to the fact that this is a forward multiple speed transmission with an over-running clutch in first gear, the transmission is usually in first gear unless set in a higher gear.

The shift rail 55 controls the second and third speeds and the lever 51 is engaged with the block 57 of the shift rail 55 when the vehicle is in first gear. To obtain neutral and reverse, the shifting lever is moved into engagement with the rail 56 by operating it laterally in the cross-over portion of the figure four formation to interlock with the block 58 of the rail 56. When this selection is made, movement of the lever 51 forwardly shifts the collar or clutch gear 27 out of clutching engagement with the final drive gear 21 of the first speed train into exclusive engagement with the driver ring or section 26 of the over-running clutch, giving neutral. Further movement forward of the lever, shifts the collar or clutch gear 27 into mesh with the reverse idler 32 and also shifts the clutch gear 27 into clutching engagement with the clutch section 30 keyed to the output shaft, the clutch 27 being then interlocked with both the driver section 21 of the over-running clutch and with the teeth 29 of the clutch section 30.

The brake is provided primarily for operation during the shifting between forward, neutral and reverse, for the purpose of overcoming the drag of the coupling and rotating the runner backwards through a few degrees to unload the torque from the gear 31, counter-shaft gear 33 and reverse pinion 32 to permit them to be easily shifted. The brake construction per se forms no part of this invention. It is shown in Figure 6 as comprising a brake drum 75 located in the assembly between the hydraulic coupling and the gear box, a brake band 76 contractible on the drum 75 by a lever 77, and a linkage 78 between the lever and the ends of the brake band, the lever being operated by or controlled by the driver through any suitable mechanism. The operation of the brake band is against the action of a resetting spring 79.

What we claim is:

1. In a transmission mechanism, a change-speed transmission gearing including an input shaft, an output shaft, a countershaft, a plurality of trains of gears between the shafts to drive the output shaft at different speeds including a reverse gear train, the rotation of the low forward speed being transmitted to the output shaft through an over-running clutch, a double clutch operable in opposite directions from neutral to connect the input and output shaft through either of two higher gear trains, a clutch gear normally clutched to one of the gears of the low forward speed train and the drive section of the over-running clutch and shiftable out of engagement therewith into exclusive neutral engagement with the drive section of the over-running clutch and from neutral position into the reverse gear train, shifting mechanism comprising a selecting and shifting lever having a fore-and-aft shifting movement and a lateral selecting movement in a path in the general outline of a figure four and selectively operable shifters connected respectively to the double clutch, and the clutch gear, the shifting lever being movable from central first speed position in one direction along the leg of the figure four outline into second and third speeds forward position and having a selecting movement laterally along the horizontal portion of the figure four formation and along the short arm of the figure four formation to shift the clutch gear out of engagement with the gear of the low speed train in neutral position and to the end of the arm of the figure four outline to shift the clutch gear into the reverse gear train.

2. The combination with an engine shaft; of a transmission mechanism, a change-speed transmission gearing including an input shaft, an output shaft, a countershaft, a plurality of trains of gears between the shafts to drive the output shaft at different speeds including a reverse gear train, the rotation of the low forward speed being transmitted to the output shaft through an over-running clutch, a clutch operable to connect the input and output shafts through a higher gear ratio including balking means, a clutch gear normally clutched to one of the gears of the low forward speed train and shiftable out of clutching engagement therewith into exclusive neutral clutching engagement with the drive section of the over-running clutch and shiftable from neutral position into gear meshing engagement with the gear of the reverse gear train, and shifting mechanism comprising a selecting and shifting lever having a fore-and-aft shifting movement and a lateral selecting movement, and a shifter connected to the first clutch, a second shifter connected to the clutch gear, and selectively operable by said lever.

3. In a change-speed transmission gearing including an input shaft, an output shaft, a countershaft, a plurality of trains of gears between the shafts to drive the output shaft at different speeds including a reverse gear train, one of the gears of the low speed train between the countershaft and the output shaft being rotatable about the shaft on which it is mounted and normally connected thereto through an over-running clutch, the reverse gear train including an intermediary gear, a clutch gear rotatable with the driver of the over-running clutch and normally clutching the same to said gear of the low speed ratio and shiftable out of engagement therewith into exclusive clutching engagement with the driver of the over-running clutch and also shiftable to carry the gear thereof into mesh with the intermediary gear and into clutching engagement with the shaft on which the driven member of the over-running clutch is mounted, a clutch operable to connect the input and output shafts through different higher speed ratios, selective shifting mechanism for the clutch and the clutch gear, including means for shifting the last-mentioned clutch to effect higher gear ratios while the clutch gear is in first speed position and operable to select neutral and reverse from first speed position.

CARL D. PETERSON.
ALBERT H. DEIMEL.